(No Model.) 2 Sheets—Sheet 2.

R. M. CHEEK & M. G. LOGAN.
PEA HULLER AND SEPARATOR.

No. 565,724. Patented Aug. 11, 1896.

Witnesses
Chas. A. Ford.
V. B. Hillyard.

Inventors
Rolie M. Cheek,
Mitchell G. Logan,
By their Attorneys,
C. A. Snow & Co.

UNITED STATES PATENT OFFICE.

ROLIE M. CHEEK AND MITCHELL G. LOGAN, OF TROPIC, GEORGIA.

PEA HULLER AND SEPARATOR.

SPECIFICATION forming part of Letters Patent No. 565,724, dated August 11, 1896.

Application filed August 6, 1895. Serial No. 558,386. (No model.)

*To all whom it may concern:*

Be it known that we, ROLIE M. CHEEK and MITCHELL G. LOGAN, citizens of the United States, residing at Tropic, in the county of Sumter and State of Georgia, have invented a new and useful Pea Huller and Separator, of which the following is a specification.

This invention relates to machinery for hulling and cleaning peas, and aims to improve apparatus of this character, increase its efficiency, and to provide a machine which will combine in its organization a minimum number of parts, and which will be light-running and perform the required work in a thorough, rapid, and satisfactory manner.

Other objects and advantages will become apparent as the nature of the invention is comprehended; and the improvement consists of the novel features which hereinafter will be more particularly set forth and claimed, and which are shown in the accompanying drawings, in which—

Figure 1:
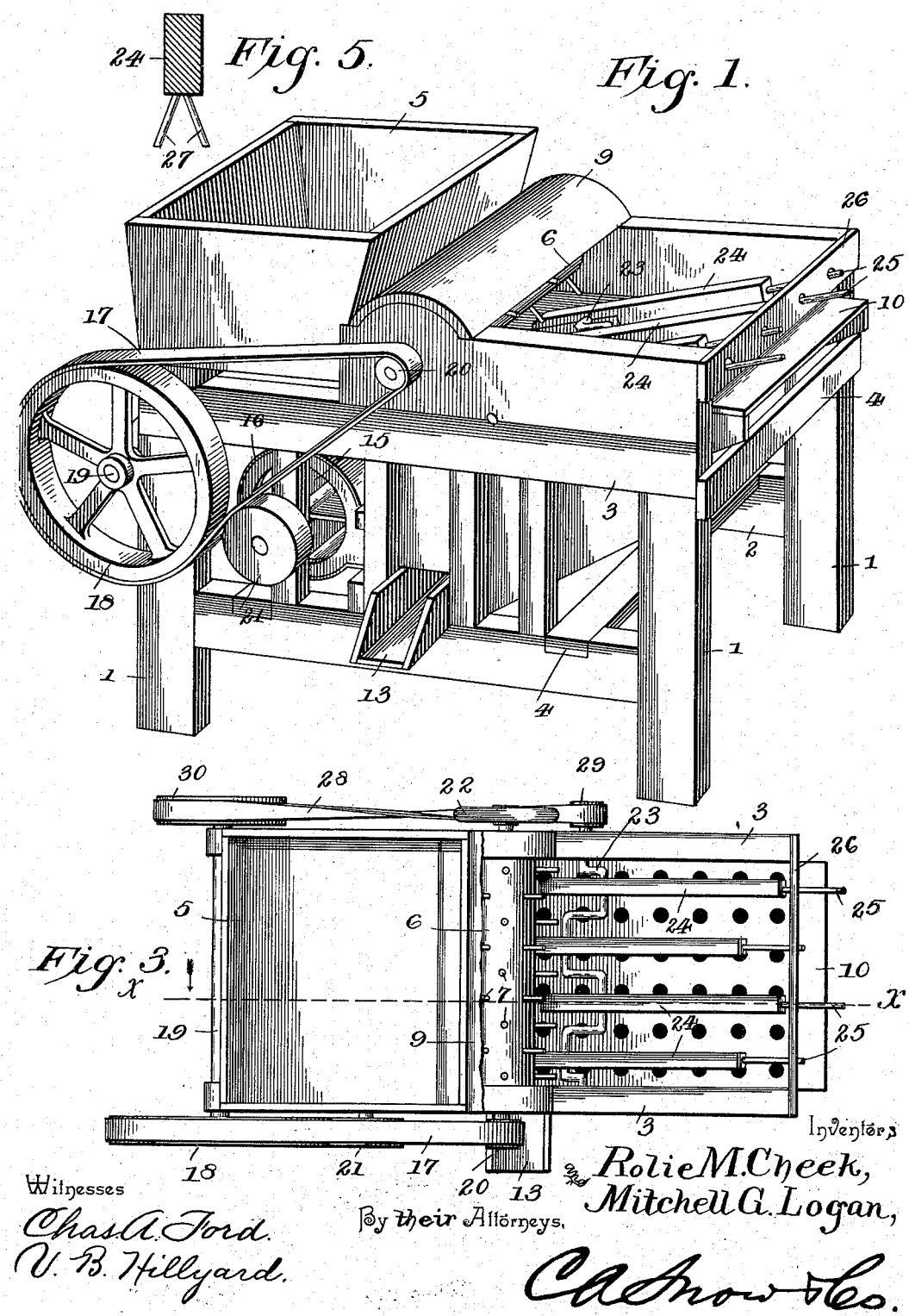
Figure 2:
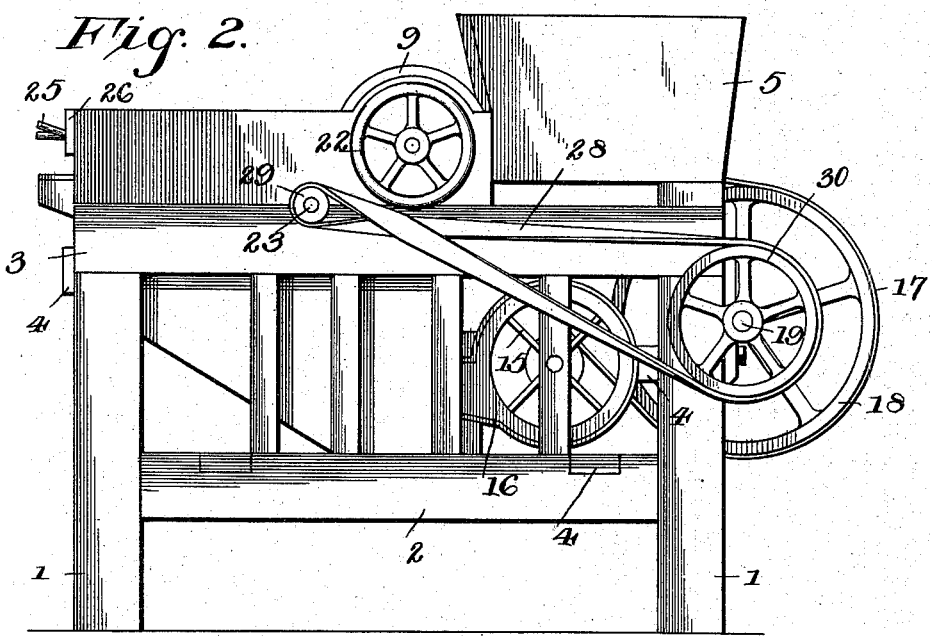
Figure 4:
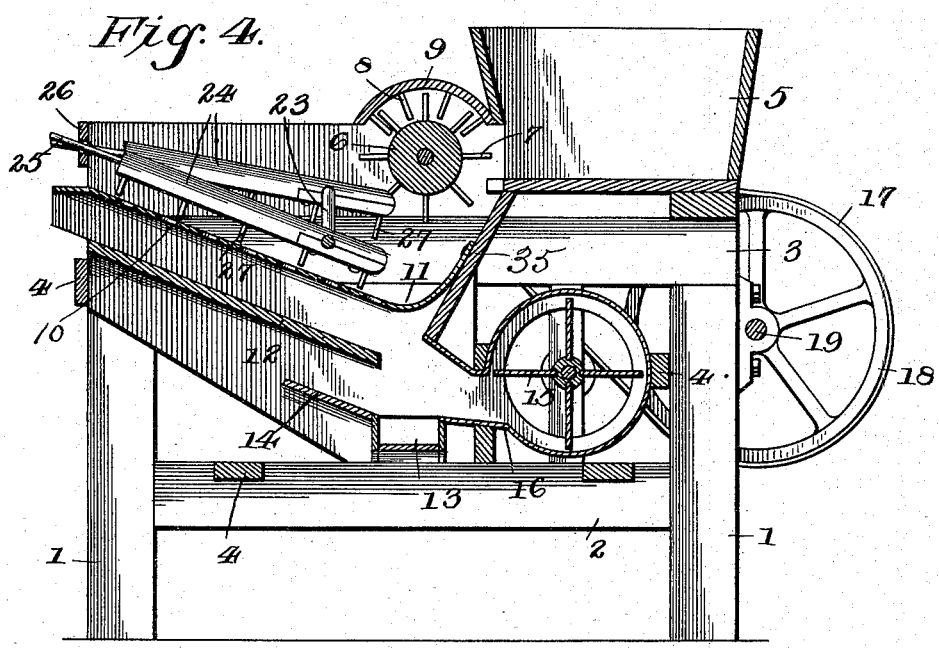

Figure 1 is a perspective view of a pea huller and separator constructed in accordance with this invention. Fig. 2 is a side elevation as viewed from the remote side of Fig. 1. Fig. 3 is a top plan view, parts being broken away. Fig. 4 is a vertical longitudinal section on the line X X of Fig. 3. Fig. 5 is a cross-section of a rake-bar, showing more clearly the staggering position of the teeth.

The framework, which may be of any desired pattern, is shown as comprising corner-posts 1, lower longitudinal beams 2, upper longitudinal beams 3, and suitable cross-beams 4 for tying the longitudinal beams and corner-posts together, whereby a substantial structure is attained. A hopper 5 is located at the front end of the framework, and is open at the lower portion of its rear wall for the passage of the peas to the hulling mechanism. The hulling-cylinder 6 is located immediately in the rear of the hopper and opposite the opening in its rear wall, and this cylinder is provided with a series of teeth 7, which coöperate with the corresponding teeth 8 of the breast or concave 9, which latter is disposed above the hulling-cylinder and immediately in the rear of the hopper. The riddle or sieve 10 inclines rearwardly and upwardly from its receiving end, which end is arranged below the hulling-cylinder and curves upwardly, thereby providing a trough 11 at the front end of the riddle or sieve into which are received the hulls and peas. This riddle or sieve may be of any of the usual forms commonly provided in pea-threshers, and is a metal plate having openings formed therein sufficiently large for the passage of the peas.

A return-board 12 is placed beneath the riddle or sieve and extends about parallel therewith, and its purpose is to receive the peas as the latter pass through the riddle and convey them to a laterally-disposed trough or spout 13, arranged about midway of the length of the framework and at the delivery end of the said return-board.

A plate 14 is arranged in the rear of the spout 13 and inclines upwardly and rearwardly therefrom, and the front edge of this plate 14 is in the plane of the top edge of the said spout, so that the peas blown by the force of the blast of air from the fan lodging upon the said plate will return to the spout without any obstruction being offered to their free travel.

A fan 15 of any desired pattern is located beneath the hopper and in front of the spout 13, and its trunk 16 communicates with the space formed between the riddle and the return-board 12 and with the space between the said return-board 12 and the plate 14, so as to direct a blast of air into the said two spaces for removing chaff and like particles of the hulls which may pass through the riddle together with the peas. Thus it will be seen that the peas in falling from the riddle upon the return-board 12 are subjected to a current of air which carries off the greater bulk of the chaff and small particles of the hulls, and the peas in dropping from the return-board 12 into the spout 13 are treated to a second blast of air, which removes the last traces of chaff and like foreign matter.

Any suitable mechanism may be devised for operating the fan and the hulling-cylinder, and, as shown, a belt 17 connects the pulley 18, mounted upon one end of the shaft 19, with a corresponding pulley 20 on one end of the hulling-cylinder shaft. A pulley 21 on the fan-shaft is engaged by the belt 17 and is driven thereby for operating the fan. A balance-wheel 22 is mounted upon the opposite end of the hulling-cylinder shaft and is designed to steady the movements of the operating parts in the manner well understood.

A multiple-crank shaft 23 is journaled in suitable bearings in the upper longitudinal beams of the framework, and its crank portions are alternately disposed and extend in diametrically opposite directions. This multiple-crank shaft is arranged above the riddle, and the rake-bars 24 are mounted upon the crank portions thereof and are operated thereby, so as to move the hulls over the riddle and toward the rear of the machine, where they may be received in a suitably-placed receptacle or be permitted to drop in a pile upon the ground. These rake-bars 24 have reduced or guide portions 25 at their rear ends, which operate through openings in a cross-bar 26, and by means of which the rear ends of the rake-bars are supported and directed in their movements. The teeth 27 provided on the under side of the rake-bars are set staggering or are provided in pairs, the teeth of each pair oppositely inclining at their free ends, so as to cover an extended area and facilitate the movement of the hulls over the riddle. A crossed belt 28 connects the pulley 29 on one end of the multiple-crank shaft 23 with a pulley 30 on the adjacent end of the shaft 19, and by this means the shaft 23 is rotated in an opposite direction to the rotation of the cylinder 6, as will be readily understood.

At this point attention is directed to a very important and essential feature of the present invention, which is the relative arrangement of the hopper 5, the hulling-cylinder 6, the sieve-plate 10, and the toothed rake-bars in conjunction with an inclined deflecting-board 35, which deflecting-board 35 declines rearwardly from the bottom of the hopper at the lower edge of its feed-opening in the rear wall thereof. The sieve-plate 10 is preferably made of sheet metal, as hereinbefore explained, and is provided at its inner end with a curved imperforate trough portion 11, which is attached directly to the board 35 and is thereby disposed directly below the hulling-cylinder 6. By reason of this specific disposition of the imperforate trough portion 11 of the sieve-plate it will be obvious that any stock which is not caught up by the hulling-cylinder will pass out of the feed-opening of the hopper onto the board 35, which will deflect the same directly into the said trough 11, and during the operation of the machine a certain amount of stock will not be thrown by the hulling-cylinder toward the rear end of the sieve-plate, but will fall almost vertically from the hulling-cylinder into the trough 11, which trough thereby serves the very important function of a catch-trough for all portions of the stock not caught nor thrown rearwardly by the hulling-cylinder. The toothed rake-bars 24 are arranged over the riddle-plate and are of such length that their inner ends are designed to work directly over the imperforate curved trough portion 11 of the sieve-plate and will take hold of the stock in such trough and work the same upwardly over the sieve-plate and complete the separating action of the machine.

The peas to be hulled are placed in bulk in the hopper 5 and are urged forward by the attendant and are taken up by the teeth of the hulling-cylinder and are threshed by the teeth of the hulling-cylinder and the teeth of the breast or concave in the usual manner. The hulls and peas fall upon the riddle and are carried rearwardly over the latter by the rake-bars, the peas falling through the openings of the riddle, whereas the hulls are discharged over the rear end of the riddle. The peas dropping from the riddle upon the return-board 12 are directed by the latter into the spout 13 and are delivered thereby into a suitably-placed receptacle. The chaff, light particles, and small pieces of hulls are carried off by the blast of air created by the fan 15 substantially in the manner set forth.

By having the riddle 10 inclining upwardly and rearwardly and the toothed rake-bars 24 operating thereover the peas not readily escaping through the riddle will roll thereon and gravitate toward the trough 11 and not be carried over the riddle with the hulls and lost, and by forming the riddle and the trough in one piece of sheet metal in the manner shown a light and compact construction is the result and the trough can be made to conform to the path of the inner ends of the rake-bars, thereby insuring a thorough agitation of the peas and hulls and preventing the lodgment and banking of the same in the trough. The locating of the hulling-cylinder opposite the opening in the rear wall of the hopper prevents the escape of the peas without being hulled, and the disposition of the return-board 12 and the plate 14 with respect to the spout 13 and the fan 15 makes a compact arrangement and insures a thorough cleaning of the peas by the removal therefrom of all light particles. Moreover, the hulls and peas are discharged from the hulling mechanism by the overshot action of the hulling-cylinder and are given an initial impetus toward the rear end of the riddle, and the said peas and hulls in their descent are loosened and lightened by coming in contact with the rake-bars, thereby facilitating the separation and insuring the same being effected in a thorough manner and in a comparatively short space of time.

A machine of the construction specified can be adapted for use in factories or for farmers, and may be operated by manual or other power. Hence in the embodiment of the same for the particular requirement it is obvious that various changes in the form, proportion, and the minor details of construction may be resorted to without departing from the principle or sacrificing any of the advantages of this invention.

Having thus described the invention, what is claimed as new is—

In a pea huller and separator, the frame, a hopper supported on the frame and provided with a feed-opening in its rear wall and directly above its bottom, a cylinder-concave arranged in rear of the hopper and joined to the same at the upper edge of its rear feed-opening, a hulling-cylinder rotating directly at one side of the feed-opening and under the concave, an inclined deflecting-board 35 declining rearwardly from the bottom of the hopper at the lower edge of its feed-opening, a stationary inclined sheet-metal sieve-plate, upwardly inclined toward the rear end of the frame, and provided at its inner lower end with a curved imperforate trough portion 11 joined to the deflecting-board 35 and disposed directly below the hulling-cylinder to receive portions of the stock not caught nor thrown rearwardly by said cylinder, a suitably-arranged fan, a series of longitudinally-vibrating toothed rake-bars arranged over the sieve-plate and having their inner ends working over and into the imperforate curved trough portion 11 of the sieve-plate, and a multiple-crank shaft rotating in an opposite direction to the hulling-cylinder and having its cranks connected with said rake-bars, substantially as set forth.

In testimony that we claim the foregoing as our own we have hereto affixed our signatures in the presence of two witnesses.

R. M. CHEEK.
M. G. LOGAN.

Witnesses:
F. A. HOOPER,
J. H. ALLEN.